United States Patent
Hayashi (10) Patent No.: US 8,113,538 B2
(45) Date of Patent: Feb. 14, 2012

(54) AIRBAG COVER AND AIRBAG DEVICE

(75) Inventor: Shinji Hayashi, Tokyo (JP)

(73) Assignee: Takata Corporation, Tokyo (JP)

( * ) Notice: Subject to any disclaimer, the term of this patent is extended or adjusted under 35 U.S.C. 154(b) by 55 days.

(21) Appl. No.: 12/403,199

(22) Filed: Mar. 12, 2009

(65) Prior Publication Data

US 2009/0236831 A1    Sep. 24, 2009

(30) Foreign Application Priority Data

Mar. 21, 2008   (JP) .................................. 2008-072986
Jan. 12, 2009   (JP) .................................. 2009-004149

(51) Int. Cl.
*B60R 21/215* (2011.01)
(52) U.S. Cl. ...................................... 280/728.3; 280/732
(58) Field of Classification Search ............... 280/728.3, 280/728.2, 732, 731, 730.2; *B60R 21/215*
See application file for complete search history.

(56) References Cited

U.S. PATENT DOCUMENTS

| | | | |
|---|---|---|---|
| 5,330,223 A * | 7/1994 | Hiramitsu et al. | 280/728.2 |
| 5,584,502 A * | 12/1996 | Phillion et al. | 280/728.3 |
| 5,590,903 A * | 1/1997 | Phillion et al. | 280/728.3 |
| 5,615,908 A * | 4/1997 | Phillion et al. | 280/728.3 |
| 5,681,051 A * | 10/1997 | Phillion | 280/728.3 |
| 5,806,882 A * | 9/1998 | Stein et al. | 280/730.2 |
| 5,897,134 A * | 4/1999 | Stein et al. | 280/728.3 |
| 6,019,428 A * | 2/2000 | Coffield | 297/284.9 |
| 6,039,342 A * | 3/2000 | Sasaki | 280/728.3 |
| 6,341,796 B1 * | 1/2002 | Preisler | 280/728.3 |
| 6,488,309 B1 * | 12/2002 | Malczyk et al. | 280/728.3 |
| 6,716,519 B2 * | 4/2004 | Ueno et al. | 428/308.4 |
| 6,789,816 B2 * | 9/2004 | Mar et al. | 280/728.3 |

FOREIGN PATENT DOCUMENTS

| | | |
|---|---|---|
| EP | 1 193 140 A2 | 4/2002 |
| EP | 1 731 381 A2 | 12/2006 |
| GB | 2 439 011 A | 12/2007 |
| JP | H09-150696 A | 6/1997 |
| JP | H10-236260 A | 9/1998 |
| JP | 2006-044552 | 2/2006 |
| JP | 09-272390 | 10/2007 |
| JP | 2007-290409 | 11/2007 |

\* cited by examiner

*Primary Examiner* — Paul N Dickson
*Assistant Examiner* — Keith Frisby
(74) *Attorney, Agent, or Firm* — Fitch Even Tabin & Flannery (57) ABSTRACT

An airbag cover and an airbag device capable of improving an outer appearance of the airbag cover and simplifying a structure of a hinge portion are provided. In one form, an airbag cover is formed by integrally resin molding a plate portion which forms a vehicle interior surface with an inner case to be disposed on the back surface of the plate portion to form an inflation/development path of an airbag. The airbag cover includes a door member formed in the plate portion so as to be split upon inflation/development of the airbag, and a hinge portion which turnably retains the door member. The hinge portion includes a first thin portion formed at a connection portion between the inner case and the plate portion, and plural first ribs disposed on the outer surface of the first thin portion so as to be bent or buckled upon the inflation/development of the airbag.

28 Claims, 10 Drawing Sheets

AIRBAG COVER AND AIRBAG DEVICE

FIELD OF THE INVENTION

The present invention relates to an airbag cover which forms an opening of the airbag, and an airbag device provided with the airbag cover, and more specifically, it relates to an airbag cover assembled with a vehicle interior surface such as an instrument panel, and an airbag device.

BACKGROUND OF THE INVENTION

Generally, the vehicle such as an automobile is equipped with the airbag device which inflates and develops the airbag therein in such an emergency as collision to restrain the occupant. Various types of the airbag device including the airbag device for driver's seat, which is installed in the steering wheel, the passenger airbag device installed in the instrument panel, the side airbag device installed in the side surface of the vehicle or the seat, the knee airbag device installed in the lower portion of the dash board and the like have been developed and employed. Normally, the airbag device of the aforementioned type is stored in the vehicle part so as not to be noticed by the passenger in the normal state, and is structured to inflate and develop the airbag toward the vehicle interior by breaking the vehicle part in the emergency. The opening of the airbag is required to be covered so as to be assimilated into the vehicle interior surface. Meanwhile, the airbag is required to be ready for smoothly and rapidly inflating/developing in the emergency.

The aforementioned airbag device includes an airbag folded in the normal state so as to be inflated/developed in an emergency, an inflator which supplies gas to the airbag, a retainer which stores the airbag, and an airbag cover which forms the vehicle interior surface in engagement with the retainer. The airbag cover is a thin resin molded plate having a groove called tear line formed in the back surface. The tear line is a groove as a thin portion through which the airbag easily breaks the airbag cover. The door member formed by breaking the airbag cover is turnably held by the hinge portion of the airbag cover to form the opening through which the airbag inflates and develops.

The airbag cover which is integrally resin molded with the inner case for forming the inflation/development path of the airbag on the back surface has been disclosed (for example, see Japanese Unexamined Patent Application Publication No. 2007-290409). The airbag cover disclosed in Japanese Unexamined Patent Application Publication No. 2007-290409 has the protruding leg piece on the back surface of the non-development portion other than the hinge portion, and has the proximal end portion provided with the first thin portion with small thickness in order to prevent generation of the sink (deformation caused by shrinkage upon resin curing) in the airbag cover surface during manufacturing when the leg piece of the inner case is thick.

The airbag cover disclosed in Japanese Unexamined Patent Application Publication No. 2007-290409 includes the hinge portion separately from the first thin portion of the leg piece, which requires another hinge portion for turnably retaining the door member while keeping the door member engaged, thus making it difficult to design the hinge portion.

SUMMARY OF THE INVENTION

Accordingly, the object of the present invention is to provide an airbag cover and an airbag device for improving the outer appearance of the airbag cover, and simplifying the structure of the hinge portion.

According to the present invention, an airbag cover is formed by integrally molding a plate portion which forms a vehicle interior surface with an inner case to be disposed on a back surface of the plate portion to form an inflation/development path of an airbag. The airbag cover includes a door member formed in the plate portion so as to be split upon inflation/development of the airbag, and a hinge portion which turnably retains the door member. The hinge portion includes a first thin portion formed at a connection portion between the inner case and the plate portion, and a plurality of first ribs disposed on an outer surface of the first thin portion so as to be bent or buckled upon the inflation/development of the airbag.

In the present invention, an airbag device includes an airbag which is folded in a normal state, and inflates and develops in an emergency, an inflator which supplies gas to the airbag, a retainer which stores at least the airbag, and an airbag cover which engages the retainer to form a vehicle interior surface. The airbag cover is formed by integrally molding a plate portion which forms a vehicle interior surface with an inner case to be disposed on a back surface of the plate portion to form an inflation/development path of an airbag. The airbag cover includes a door member formed in the plate portion so as to be split upon inflation/development of the airbag, and a hinge portion which turnably retains the door member. The hinge portion includes a first thin portion formed at a connection portion between the inner case and the plate portion, and a plurality of first ribs disposed on an outer surface of the first thin portion so as to be bent or buckled upon the inflation/development of the airbag.

In the airbag cover and the airbag device according to the present invention, preferably, the door member is formed to be splittable through a tear line formed in the plate portion, and the first thin portion has a thickness equal to or smaller than that of the tear line. The first rib may have a thickness larger than that of the first thin portion. The first ribs may be sequentially arranged at a pitch ranging from 3 to 15 mm. The first rib may include an adjustment portion capable of adjusting a degree of bending or buckling generated upon the inflation/development of the airbag. The plate portion may include plural reinforcement ribs on the back surface, and the reinforcement rib may have a thickness substantially equal to or larger than that of the first rib. For example, the thickness of the first thin portion is set to be in the range from 0.5 to 1.0 mm, the thickness of the first rib is set to be in the range from 1.0 to 1.3 mm, and the thickness of the reinforcement rib is set to be in the range from 1.0 to 1.8 mm, respectively.

In the airbag cover and the airbag device according to the present invention, the first thin portion may be diagonally formed outside the inner case. The first thin portion may be formed at an extending portion as an outwardly extending portion of the inner case. A second rib with the strength lower than the first rib may be formed on the inner surface of the first thin portion. For example, the second rib is structured to have the volume or thickness smaller than that of the first rib. Alternatively, the number of the second ribs may be smaller than that of the first ribs.

The first joint portion defined by the first thin portion and the extending portion may have a thickness larger than that of a connecting portion which connects the first thin portion to the plate portion. The second joint portion defined by the extending portion and a leg portion of the inner case may have a thickness larger than that of the first joint portion. The second joint portion may have rigidity higher than that of the leg portion. The extending portion may include low-rigidity portions each with rigidity lower than that of other portion, which are formed around both ends along the hinge portion. The plate portion may include a tear line formed around the low-rigidity portion.

In the airbag cover and the airbag device according to the present invention, preferably a second thin portion is formed at a portion for connecting the plate portion to the inner case, which does not form the hinge portion. Preferably, the door member is formed to be splittable through a tear line formed in the plate portion, and the second thin portion has a thickness substantially equal to or smaller than that of the tear line.

In the airbag cover and the airbag device according to the present invention, the first thin portion is formed at a connection portion between the plate portion and the inner case so as to suppress deformation of the connection portion resulting from shrinkage upon resin curing, and to prevent generation of the sink on the airbag cover. This makes it possible to improve the outer appearance of the airbag cover. In the present invention, the hinge portion is formed by attaching the first rib to the outer surface of the first thin portion. This may eliminate the need of forming the thin portion on the plate portion for forming the hinge portion. This makes it possible to simplify the hinge structure. The first rib is formed to be bent and buckled to absorb the impact generated upon turning of the door member. This makes it possible to suppress disengagement of the door member while maintaining the development performance of the airbag.

The first thin portion is formed to have its thickness substantially equal to or smaller than that of the tear line to effectively suppress generation of the sink. The first rib which is thicker than the first thin portion is capable of effectively reinforcing the first thin portion. The first ribs are arranged at a predetermined pitch to easily adjust the strength, and are bent or buckled to effectively absorb the impact generated upon turning of the door member while reinforcing the first thin portion. The reinforcement rib is formed to have the thickness substantially equal to or larger than that of the first rib to effectively suppress generation of the sink over the entire surface of the plate portion. This makes it possible to further improve the outer appearance of the airbag cover. It is especially effective when the thickness of the first thin portion is set to be in the range from 0.5 to 1.0 mm, the thickness of the first rib is set to be in the range from 1.0 to 1.3 mm, and the thickness of the reinforcement rib is set to be in the range from 1.0 to 1.8 mm, respectively. The first rib is provided with the adjustment member so as to adjust the degree of bending or buckling in accordance with the required rigidity and turning performance of the hinge portion.

The first thin portion is diagonally formed outside the inner case such that the door member is easily turned, thus improving the development performance of the airbag. The first thin portion is formed at the extending portion of the inner case to bring the supporting point of the hinge portion apart from the inflation/development path of the airbag to allow the door member to be easily turned. This makes it possible to further improve the development performance of the airbag.

The first joint portion is made thicker than the connecting portion to allow the resin to easily flow upon resin molding of the inner case. This makes it possible to easily mold the desired inner case, and to effectively suppress generation of the sink upon resin curing. The second joint portion is made thicker than the first joint portion to allow the resin to flow efficiently upon resin molding of the inner case. The second joint portion has the rigidity higher than that of the leg portion to improve the rigidity of the hinge portion. This makes it possible to suppress deformation of the inner case upon inflation/development of the airbag, thus suppressing distortion of the rotating axis of the hinge portion. The extending portion has the low-rigidity portion to suppress distortion of the rotating axis of the hinge portion, thus smoothly turning the door member. The tear line is formed around the low-rigidity portion to stabilize the split direction of the plate portion, thus smoothly turning the door member.

The second rib attached to the inner surface of the first thin portion is elongated accompanied with turning of the door member such that the impact generated upon turning of the door member is effectively absorbed. This makes it possible to suppress disengagement of the door member while maintaining the development performance of the airbag. The second rib has the strength lower than that of the first rib to smoothly turn the door member.

The second thin portion is formed in the connection portion between the inner case and the plate portion to suppress the sink generated over the connection portion therebetween to further improve the outer appearance of the airbag cover. The second thin portion is formed to have the thickness substantially equal to or smaller than that of the tear line to effectively suppress generation of the sink.

BRIEF DESCRIPTION OF THE DRAWINGS

FIGS. 1A-1C show an airbag cover according to a first embodiment of the present invention, wherein

FIGS. 2A and 2B show the airbag cover according to the first embodiment of the present invention, wherein

FIGS. 3A and 3B show the inflation/development process of the airbag, wherein

FIGS. 4A and 4B show sectional views of an airbag cover according to a second embodiment of the present invention, wherein

FIGS. 5A and 5B show sectional views of the airbag cover according to other embodiments of the present invention, wherein

FIGS. 6A-6C show sectional views of the airbag cover according to other embodiments of the present invention, wherein

FIGS. 7A-7D show modified examples of a first rib, wherein FIG. 7A shows a first modified example.

FIGS. 8A-8D show modified examples of a hinge portion, wherein

FIGS. 9A and 9B show the hinge portion as a fifth modified example, wherein

DETAILED DESCRIPTION OF THE PREFERRED EMBODIMENTS

Figure 1A:
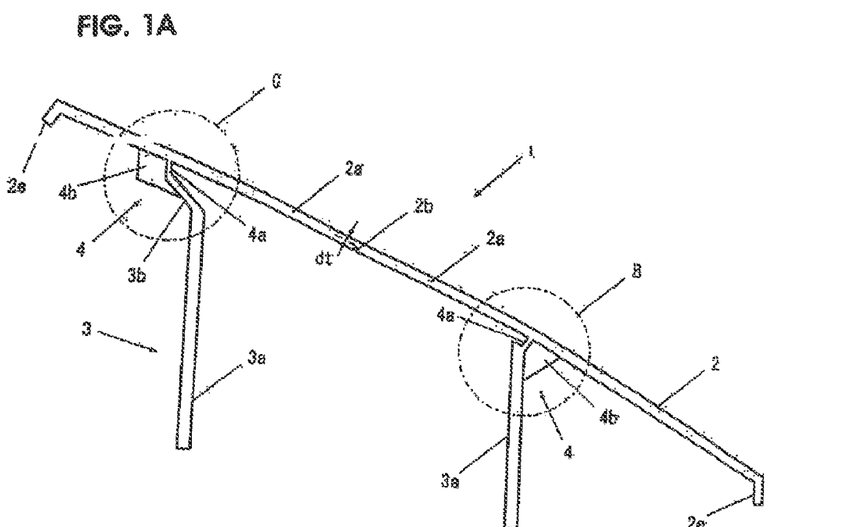
FIG. 1A is a sectional view.
Figure 1B:
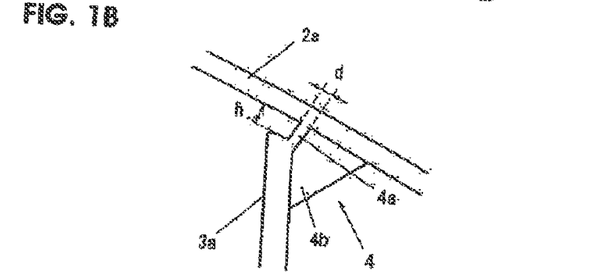
FIG. 1B is an enlarged view of an area B shown in FIG. 1A.
Figure 1C:
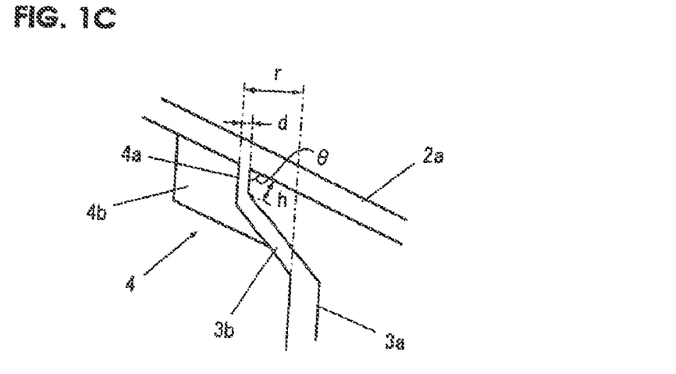
FIG. 1C is an enlarged view of an area C shown in FIG. 1A.
Figure 2A:
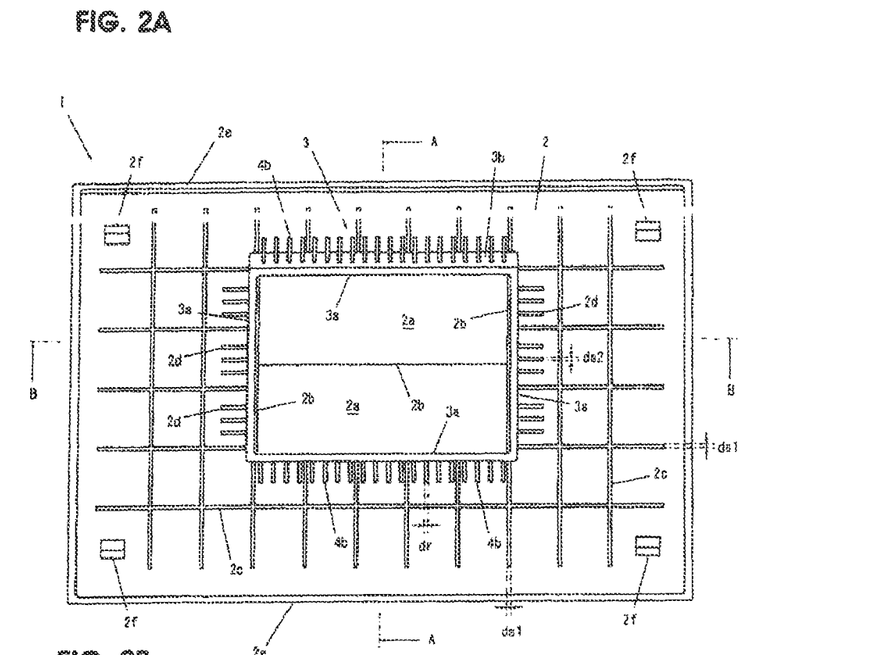
FIG. 2A is a back view.
Figure 2B:
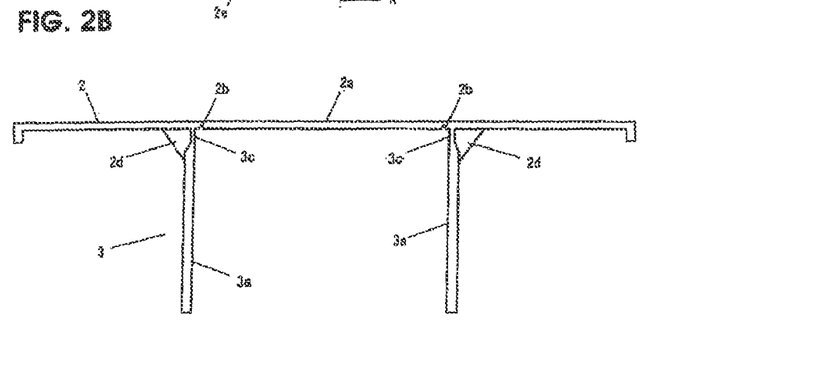
FIG. 2B is a sectional view taken along line B-B shown in FIG. 2A.

Embodiments of the present invention will be illustrated referring to FIGS. 1 to 10. FIG. 1 shows an airbag cover according to a first embodiment of the present invention. FIG. 1(A) is a sectional view, FIG. 1(B) is an enlarged view of an area B shown in FIG. 1(A), and FIG. 1(C) is an enlarged view of an area C shown in FIG. 1(A). FIG. 2 shows the airbag cover according to the first embodiment of the present invention. FIG. 2(A) is a back view, and FIG. 2(B) is a sectional view taken along line B-B shown in FIG. 2(A). The sectional view shown in FIG. 1(A) is the one taken along line A-A shown in FIG. 2(A).

An airbag cover 1 shown in FIGS. 1 and 2 is formed by integrally resin molding a plate portion 2 which forms a vehicle interior surface with an inner case 3 which is disposed on the back surface of the plate portion 2 to form an inflation/development path of the airbag. The airbag cover includes a door member 2a as a part of the plate portion 2 which is splittable upon inflation/development of the airbag, and a hinge portion 4 which turnably retains the door member 2a. The hinge portion 4 includes a first thin portion 4a formed at a portion of the inner case 3 connected to the plate portion 2, and plural first ribs 4b each disposed on the outer surface of the first thin portion 4a so as to be bent or buckled upon inflation/development of the airbag.

The plate portion 2 is the member which partially forms the vehicle interior surface such as the instrument panel. Referring to FIG. 2(A), the inner case 3 stands on the back surface of the plate portion 2. Tear lines 2b which form substantially H-like shape each with the small thickness (dt) are formed in the area of the plate portion 2 corresponding to the inside of the inner case 3. The tear line 2b may be formed through metal molding together with the airbag cover 1, or formed through the machining process, laser process, ultrasonic process and the like after molding the airbag cover 1. Upon inflation/development of the airbag, the plate portion 2 splits along the thus formed tear line 2b such that the split portions are opened at both sides to release the airbag to the vehicle interior. The door member 2a corresponds to the portion split along the tear line 2b.

Referring to FIG. 2(A), first reinforcement ribs 2c are arranged in matrix on the back surface of the plate portion 2 so as to be reinforced therewith. The first reinforcement ribs 2c are arbitrarily arranged in accordance with the configuration or the size of the plate portion 2, which are not limited to the one shown in the drawing. The first reinforcement rib 2c has the height of about 2 to 3 mm, and the thickness ds1 which is substantially equal to that of a first rib 4b to be described later. It is preferable to set the thickness ds1 of the first reinforcement rib 2c to be in the range from 1.0 to 1.3 mm. The thickness of the first reinforcement rib 2c is set to be smaller than that of the generally employed reinforcement rib (1.3 to 1.8 mm) to suppress generation of the sink, thus improving the outer appearance of the airbag cover 1. The thickness ds1 may be set to be equal to that of the generally employed reinforcement rib in the case where generation of the sink causes no problem when the thickness ds1 is set to be larger than 1.3 mm in correlation with the height of the first reinforcement rib 2c. A leg portion 3a of the inner case 3 formed along the tear line 2b is provided with plural second reinforcement ribs 2d for reinforcing the inner case 3. A second reinforcement rib 2d defines substantially the triangular shape together with the back surface of the plate portion 2 and the leg portion 3a. The second reinforcement rib 2d is used for reinforcement likewise the first reinforcement rib 2c, and accordingly has the thickness ds2 set to be equal to the thickness ds1 of the first reinforcement rib 2c. In most cases, however, the second reinforcement rib 2d is set to be taller than the first reinforcement rib 2c. It is, thus preferable to set the thickness to be substantially equal to that of a first rib 4b to be described later (for example, in the range from 1.0 to 1.3 mm).

Referring to FIGS. 1(A) and 2(A), the plate portion 2 includes a frame 2e which forms the outer periphery, and pins 2f which stand on the back surface for positioning the plate portion 2. The pins 2f are inserted into fixing holes formed in the vehicle part such that the frame 2e is fit with the opening of the vehicle part. Referring to FIG. 2(A), the plate portion 2 has a rectangular shape. However, the shape of the plate portion 2 is not limited as above. In many cases, the surface of the plate portion 2 is coated with resin or such cover member as leather.

The inner case 3 is formed of the tubular leg portions 3a which stand on the back surface of the plate portion 2 to form the rectangular shape as shown in FIGS. 1(A) and 2(A). The plate portion 2 is assembled with the vehicle part having the surface directed toward the occupant to allow the airbag to inflate/develop toward the occupant. As shown in FIG. 1(A), it is often the case that the inner case 3 is disposed diagonally to the plate portion 2. The airbag cover 1 according to the present invention is formed by integrally resin molding the thus structured inner case 3 with the plate portion 2. Specifically, the resin is fed into the metal mold and cured, and then the metal mold is removed to provide the airbag cover 1 with the desired configuration. The airbag cover 1 of this type has the thickness of the resin layer largely changed at the connection portion between the plate portion 2 and the leg portion 3a of the inner case 3, and as a result, the shrinkage amount upon resin curing becomes large. Then the recess so called sink is generated on the surface of the plate portion 2 along the configuration of the leg portion 3a, resulting in deteriorated outer appearance of the airbag cover 1. The connection portion between the plate portion 2 and the leg portion 3a of the inner case 3 has to be made as thin as possible in order to suppress generation of the sink such that the recess is hardly noticed by the human. Meanwhile, if the connection portion is made too thin, it will be easily broken. In Japanese Unexamined Patent Application Publication No. 2007-290409, the connection portion is formed at the position (outside the hinge portion) which is not influenced by the inflation/development of the airbag to avoid the aforementioned problem. In the present invention, the connection portion between the plate portion 2 and the leg portion 3a of the inner case 3 is made as thin as possible such that the easily deformable portion (that is, the first thin portion 4a) is used as the hinge portion 4.

The hinge portion 4 turns the door member 2a to the surface of the plate portion 2 to form the opening along the configuration of the inner case 3 for smoothly releasing the airbag to the vehicle interior. The hinge portion 4 which influences the development performance of the airbag is required to turn the door member 2a quickly upon inflation/development of the airbag while retaining the plate portion 2 so as not to be disengaged. The hinge portion 4, thus, has to be structured to be highly flexible and at the same time, resistant to deformation.

Referring to FIG. 1(B), the hinge portion 4 around the area B shown in FIG. 1(A) includes the first thin portion 4a which connects the leg portion 3a of the inner case 3 with the plate portion 2, and is thinner than both the leg portion 3a and the plate portion 2, and the first rib 4b attached to the outer surface of the first thin portion 4a. The thickness d of the first thin portion 4a is set to be substantially equal to or smaller than the thickness dt of the tear line 2b. Specifically, it is preferable to set the thickness d of the first thin portion 4a to be in the range from 0.5 to 1.0 mm. As the first thin portion 4a is made thin as described above, generation of the sink is suppressed to the level that the recess is hardly noticed by the human. This makes it possible to improve the outer appearance of the airbag cover 1. The first thin portion 4a is diagonally formed outside the inner case 3 so as to allow the door member 2a to be easily turned. Preferably, the height h of the first thin portion 4a is set to be in the range from about 0 to 10 mm, and more preferably, to be in the range from about 3 to 5 mm.

Referring to FIG. 1(B), the first rib 4b is formed into substantially the trapezoidal shape connected to the back surface of the plate portion 2, the first thin portion 4a and the leg portion 3a. The first rib 4b has to serve as the member for reinforcing the first thin portion 4a, and as the member which bends or buckles for smoothly turning the door member 2a. As the first rib 4b is connected to the back surface of the plate portion 2, its thickness dr has to be small to the level so as not to generate the sink on the surface of the plate portion 2. Accordingly, the thickness dr of the first rib 4b is larger than the thickness d of the first thin portion 4a, and is smaller than the thickness of the generally employed reinforcement rib. Specifically, it is preferable to set the thickness dr of the first rib 4b to be in the range from 1.0 to 1.3 mm. The strength of the first rib 4b may be adjusted by the number of the ribs which are arranged sequentially at the pitch ranging from 3 to 15 mm, for example. It is especially effective to arrange those ribs at the pitch ranging from 4 to 10 mm. The aforementioned first rib 4b is attached to the outer surface of the first thin portion 4a to effectively absorb the impact generated upon turning of the door member through bending or buckling while reinforcing the first thin portion. In the case where the strength of the first rib 4b is sufficiently adjusted by the number of the ribs (pitch), the thickness dr of the first rib 4b may be set to be substantially equal to the thickness d of the first thin portion 4a.

Referring to FIG. 1(C), the first thin portion 4a may be formed at the outward extending portion 3b of the inner case 3. The extending portion 3b extends outward over the entire region of the hinge portion 4 as shown in FIG. 2(A). The leg portion 3a of the inner case 3 is provided with the extending portion 3b to displace the supporting point for turning the door member 2a from the outer surface of the inner case 3 outward by the distance r, allowing the door member 2a to be easily turned. Preferably, the extending portion 3b is disposed at the hinge portion 4 required to turn the door member 2a more smoothly, for example, the hinge portion 4 around the occupant or located below the inflated airbag. The first rib 4b may be formed into a substantially quadrilateral shape connected to the back surface of the plate portion 2, the first thin portion 4a and the extending portion 3b as shown in FIG. 1(C). The distance r of the extending portion 3b is determined in accordance with conditions, for example, the stress concentration generated upon the inflation/development, and the flexibility of the hinge portion 4 influenced by the distance between the tear line 2b and the rotating axis of the hinge portion 4. Preferably, it is set to be in the range from about 0 to 15 mm, and more preferably, from about 3 to 10 mm. The angle θ defined by the first thin portion 4a and the plate portion 2 is set to be in the range from 70° to 110°, and preferably, to approximately 90°.

The connection portion between the plate portion 2 and the inner case 3 is formed at the portion which does not form the hinge portion 4, that is, at the leg portion 3a disposed along the tear line 2b and reinforced by the second reinforcement rib 2d. Referring to FIG. 2(B), a second thin portion 3c set in accordance with substantially the same condition as the first thin portion 4a may be formed at the aforementioned connection portion. As the second thin portion 3c does not form the hinge portion 4, the smooth turning of the door member 2a does not have to be considered. It may be formed straight from the leg portion 3a to the plate portion 2. As shown in FIG. 2(B), the second thin portion 3c is formed along the inner surface of the inner case 3. However, it may be formed along the outer surface of the inner case 3 or in the intermediate portion of the leg portion 3a.

Figure 3A:
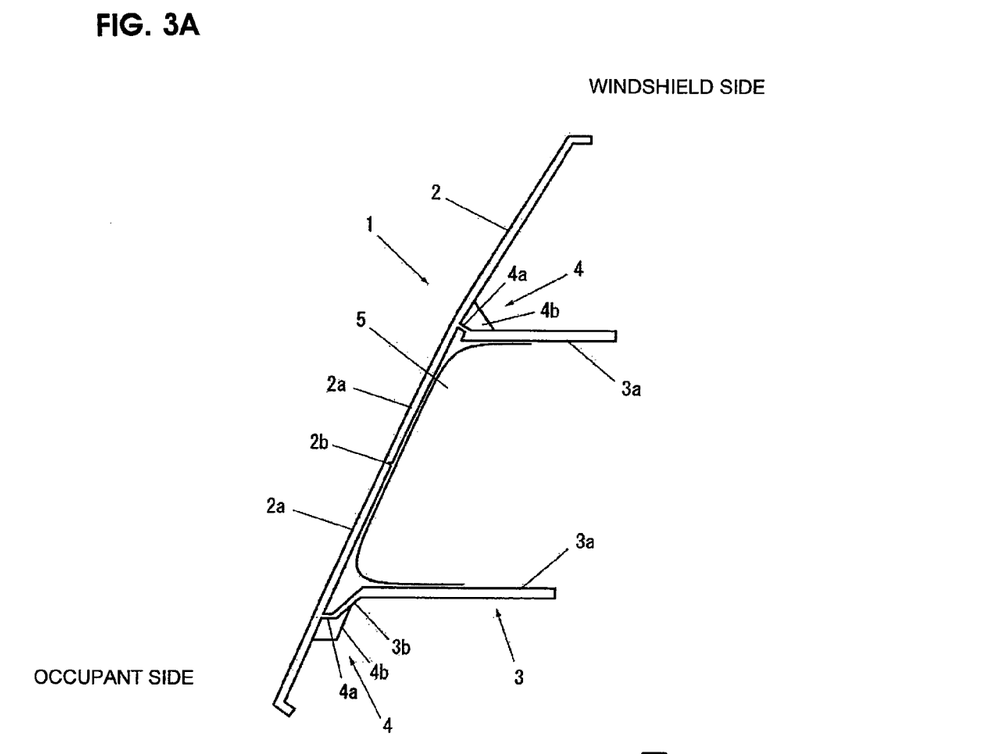
FIG. 3A shows a state before the airbag is released to the vehicle interior.
Figure 3B:
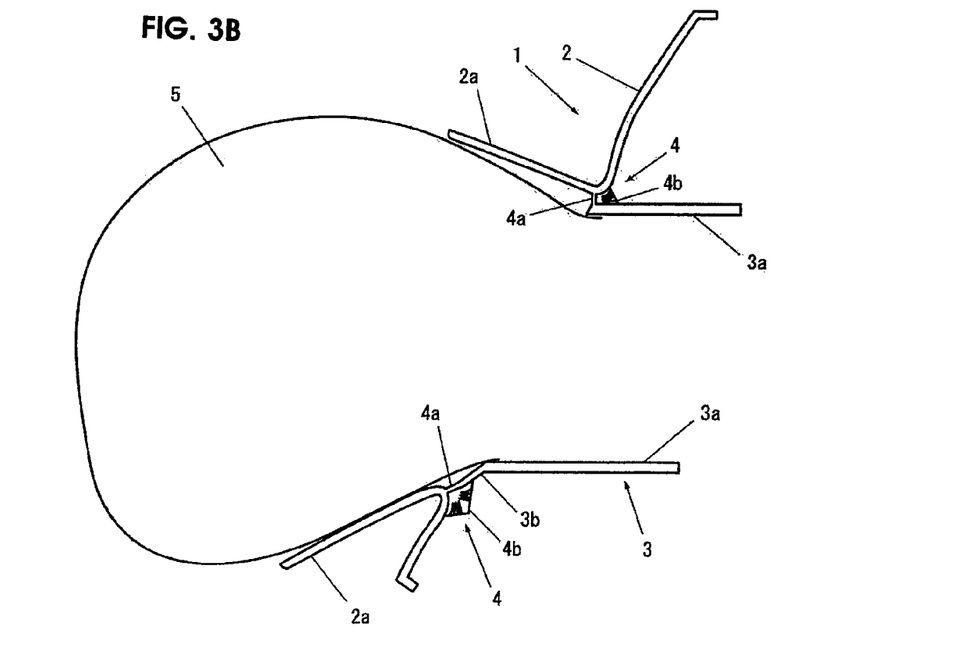
FIG. 3B shows the state after the airbag is released to the vehicle interior.

An operation of the aforementioned airbag cover 1 will be described hereinafter. FIG. 3 shows the inflation/development process of the airbag. FIG. 3(A) shows the state before the airbag is released to the vehicle interior. FIG. 3(B) shows the state after the airbag is released to the vehicle interior. In the drawing, the same components as those of the airbag cover 1 shown in FIGS. 1 and 2 will be designated with the same reference numerals, and explanations thereof, thus will be omitted.

Referring to FIG. 3(A), the airbag cover 1 is assembled with the vehicle part such that the surface of the plate portion 2 is directed toward the occupant, and the hinge portion 4 provided with the extending portion 3b is disposed near the occupant (position below the inflated airbag 5). In the emergency such as the vehicle collision, gas is supplied to the airbag 5 from an inflator (not shown), and the airbag 5 starts inflating inside the inner case 3 to be in contact with the door member 2a of the plate portion 2. The door member 2a pressed by the inflating airbag 5 is split along the tear line 2b formed as the thin portion, and turned up and down at the hinge portion 4 as the supporting point for opening at both sides. As the hinge portion 4 includes the first thin portion 4a with the small thickness, the plate portion 2 deforms around the first thin portion 4a, and serves as the hinge portion 4 of the door member 2a.

As described above, the first thin portion 4a has the thickness d which is equal to or smaller than that of the tear line 2b. However, it is reinforced by the first rib 4b with the thickness dr which is larger than each thickness of the tear line 2b and the first thin portion 4a. Breakage of the first thin portion 4a caused by the stress resulting from the turning operation of the door member 2a, thus may be suppressed. The thickness dr, the number of the first ribs (pitch), and the volume may be adjusted such that the first thin portion 4a resists the stress generated at the hinge portion 4 upon inflation/development of the airbag 5.

Referring to FIG. 3(B), as the door member 2a is turned around the hinge portion 4 as the supporting point, the hinge portion 4 and the plate portion 2 therearound are deformed, and the first rib 4b is compressed by the plate portion 2, the first thin portion 4a and the leg portion 3a (including the extending portion 3b). The first rib 4b gradually bends accompanied with deformation of the hinge portion 4 and is finally buckled. The impact caused by the centrifugal force of the door member 2a may be effectively absorbed by bending and buckling the first rib 4b. This makes it possible to suppress disengagement of the door member 2a while being smoothly turned. The extending portion 3b formed at the leg portion 3a of the inner case 3 displaces the supporting point of the door member 2a outward, thus allowing the door member 2a to be easily turned. As shown in FIG. 3(B), the door member 2a connected to the hinge portion 4 at the side provided with the extending portion 3b is allowed to be turned earlier than the other door member 2a. As the door members 2a are turned each at the different timing, the inflation/development of the airbag 5 may be made directional. This makes it possible to inflate/develop the airbag 5 to the desired direction (toward the occupant) effectively. In the drawing, the hinge portion 4 with the extending portion 3b is located near the occupant, and the hinge portion 4 without the extending portion 3b is located near the windshield.

Figure 4A:
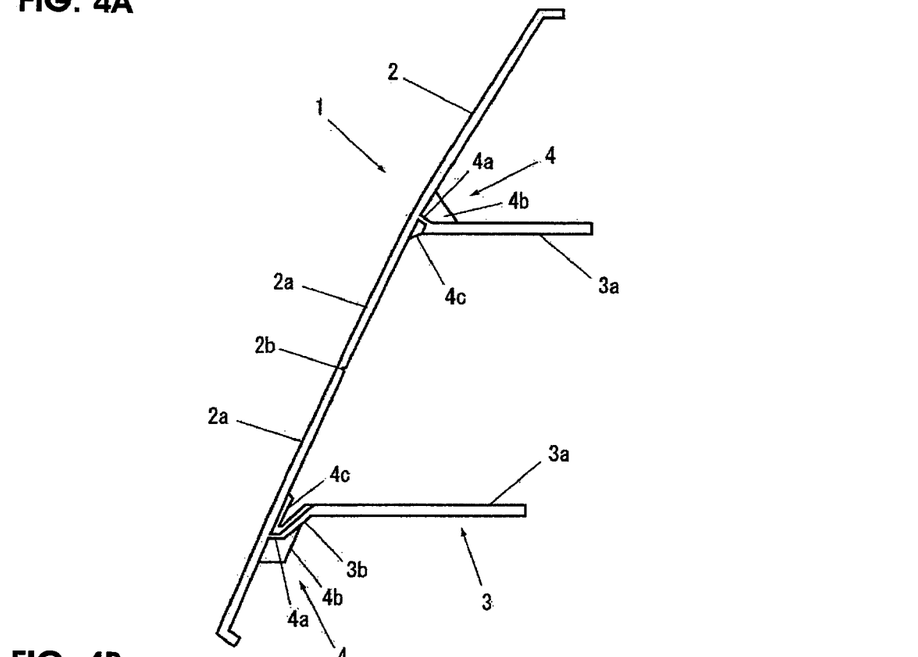
FIG. 4A shows the state of the airbag before inflation/development.
Figure 4B:
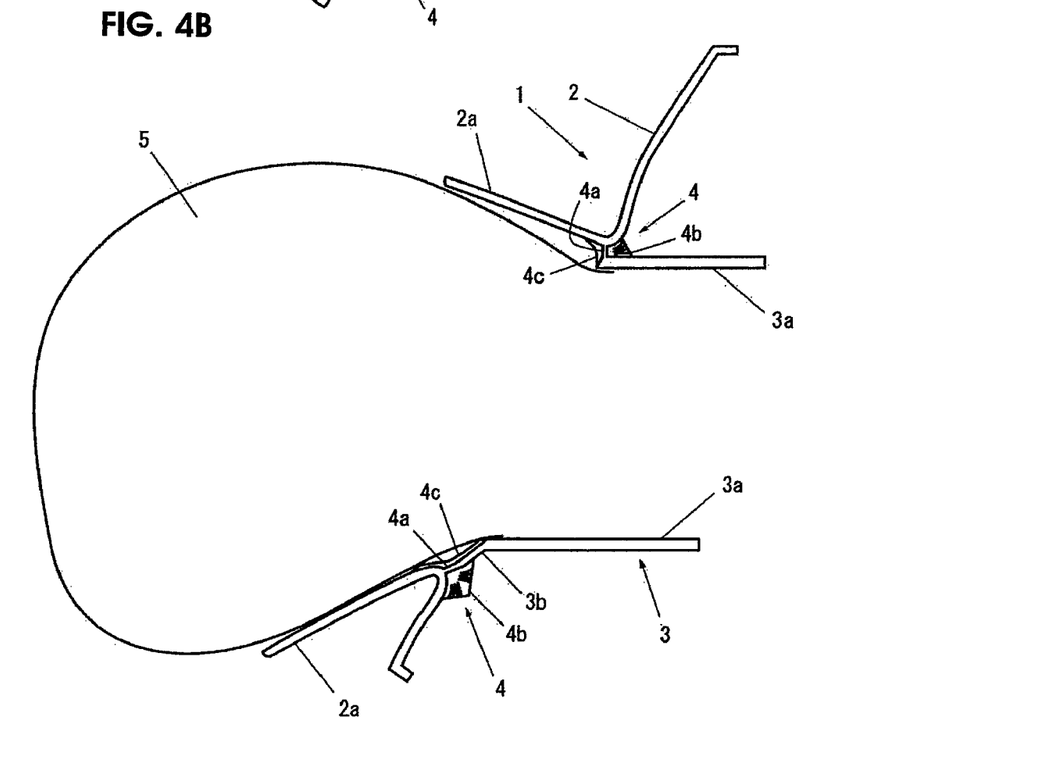
FIG. 4B shows the state of the airbag after the inflation/development.

The airbag cover 1 according to another embodiment of the present invention will be described. FIG. 4 shows sectional views each representing the airbag cover according to a second embodiment of the present invention. FIG. 4(A) shows the state of the airbag before inflation/development. FIG. 4(B) shows the state of the airbag after the inflation/development. The same components as those described in the first embodiment shown in FIGS. 1 to 3 will be designated with the same reference numerals, and explanations thereof, thus will be omitted.

In the second embodiment shown in FIG. 4(A), a second rib 4c with the strength lower than the first rib 4b is formed on the inner surface of the first thin portion 4a. Referring to FIG. 4(B), the second rib 4c elongates as the door member 2a turns, and plastically deforms to absorb the impact generated upon turning of the door member 2a effectively. This makes it possible to suppress disengagement of the door member while maintaining the development performance of the airbag. The strength of the second rib 4c is adjusted in accordance with the volume, thickness or the number of ribs (pitch) so as to be lower than that of the first rib 4b. For example, the volume or thickness of the second rib 4c may be made smaller than that of the first rib 4b, or the number of the second ribs 4c may be made smaller than the number of the first ribs 4b (increasing the pitch). As the strength of the second rib 4c is made lower than the first rib 4b, the impact may be effectively absorbed while smoothly turning the door member 2a. The second rib 4c at the position where the first thin portion 4a is formed at the extending portion 3b may be configured into substantially U-like or V-like shape along the back surface of the plate portion 2, the first thin portion 4a and the extending portion 3b. Alternatively, it may be configured into substantially quadrilateral shape likewise the first rib 4b.

Figure 5A:
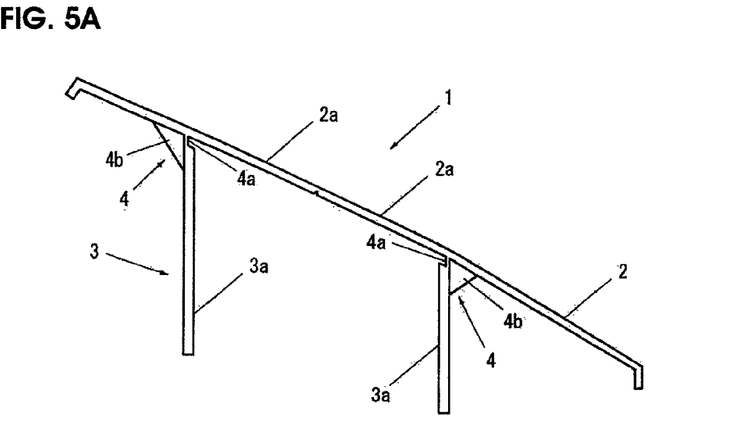
FIG. 5A shows a third embodiment.
Figure 5B:
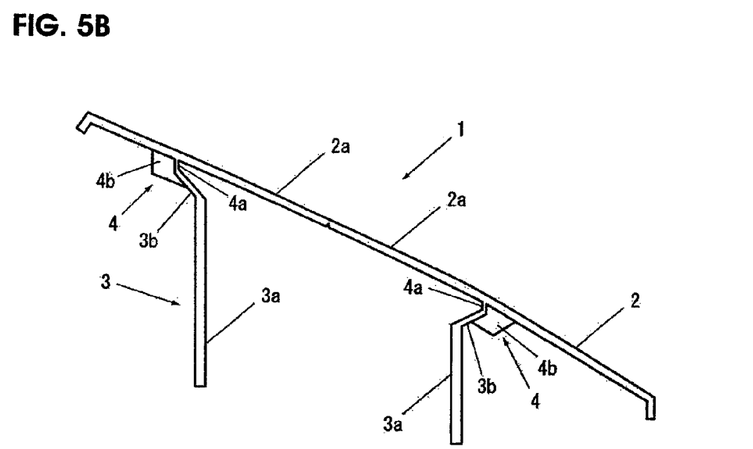
FIG. 5B shows a fourth embodiment.
Figure 5C:
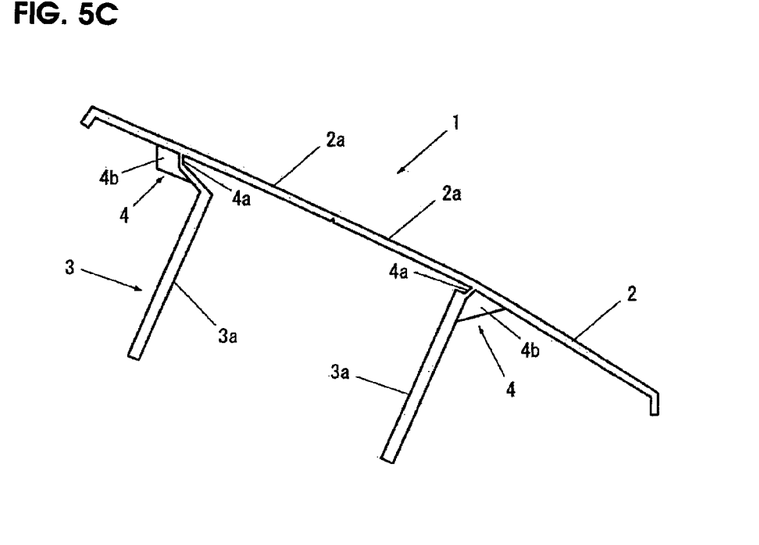
FIG. 5C shows a fifth embodiment.

The airbag cover 1 according to another embodiment of the present invention will be described. FIG. 5 shows sectional views each representing the airbag cover according to another embodiment of the present invention. FIG. 5(A) shows a third embodiment, FIG. 5(B) shows a fourth embodiment, and FIG. 5(C) shows a fifth embodiment. The same components as those described in the first embodiment shown in FIGS. 1 and 2 will be designated with the same reference numerals, and explanations thereof, thus will be omitted.

In the third embodiment shown in FIG. 5(A), the first thin portions 4a, 4a for forming the hinge portions 4 at both sides are formed along the respective outer surfaces of the leg portions 3a, 3a of the inner case 3, having triangular first ribs 4b, 4b attached to the back surface. The third embodiment provides the same effects as those derived from the first embodiment, and is effective when the airbag is desired to protrude toward the advancement direction of the inflation/development path of the airbag defined by the inner case 3. Preferably, the other connection portion between the plate portion 2 and the inner case 3 with no hinge portions 4, 4 is provided with the second thin portion 3c and the second reinforcement rib 2d.

In the fourth embodiment shown in FIG. 5(B), the first thin portions 4a, 4a for forming the hinge portions 4, 4 at both sides are formed at the outward extending portions 3b of the inner case 3, respectively and the substantially quadrilateral first ribs 4b, 4b are attached to the outer surfaces of the extending portions 3b. The fourth embodiment provides the same effects as those derived from the first embodiment, and is effective when inflating/developing the airbag with large capacity or inflating/developing the airbag widely around the surface of the plate portion 2. Preferably, the other connection portion between the plate portion 2 and the inner case 3 with no hinge portions 4, 4 is provided with the second thin portion 3c and the second reinforcement rib 2d.

In the fifth embodiment shown in FIG. 5(C), the inner case 3 is connected substantially vertically to the plate portion 2. The fifth embodiment provides the same effects as those derived from the first embodiment. Preferably, the other connection portion between the plate portion 2 and the inner case 3 with no hinge portions 4, 4 is provided with the second thin portion 3c and the second reinforcement rib 2d.

Figure 6A:
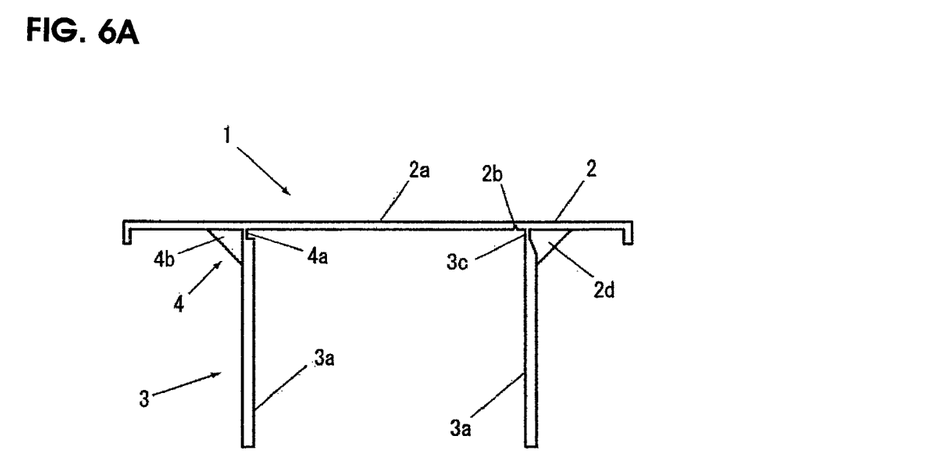
FIG. 6A shows a sixth embodiment.
Figure 6B:
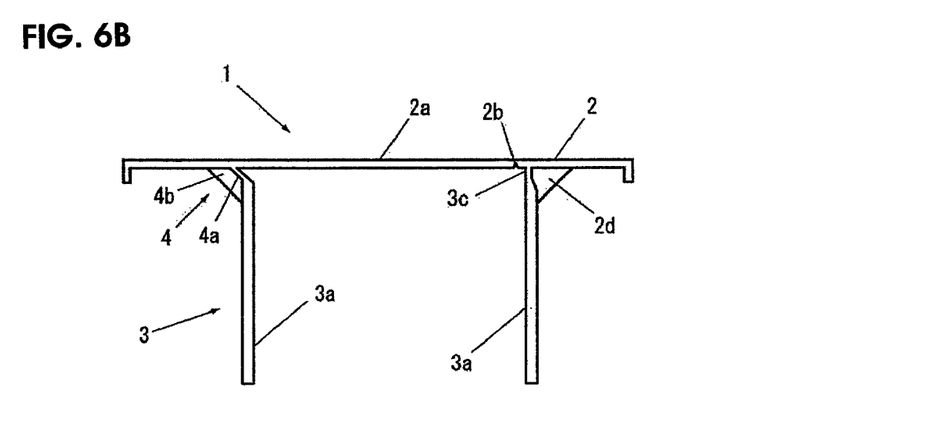
FIG. 6B shows a seventh embodiment.
Figure 6C:
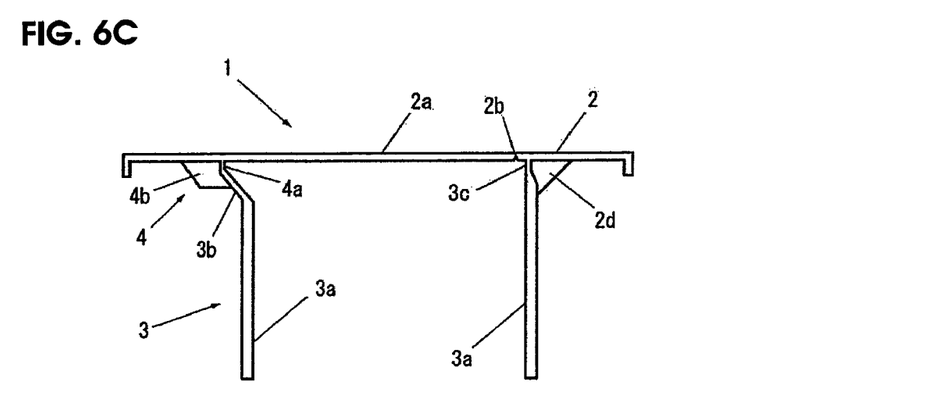
FIG. 6C shows an eighth embodiment.

The airbag cover 1 according to another embodiment of the present invention will be described. FIG. 6 shows sectional views each representing the airbag cover according to another embodiment of the present invention. FIG. 6(A) shows a sixth embodiment, FIG. 6(B) shows a seventh embodiment, and FIG. 6(C) shows an eighth embodiment. The same components as those described in the first embodiment shown in FIGS. 1 and 2 will be designated with the same reference numerals, and explanations thereof, thus will be omitted.

Each of the sixth to the eighth embodiments shown in FIGS. (A) to (C) shows the structure having the door member 2a opened at one side. A substantially U-like tear line 2b is formed in the back surface of the plate portion 2 surrounded by the inner case 3. The first thin portion 4a and the first rib 4b are formed at the connection portion between the plate portion 2 and the inner case 3 which form the hinge portion 4. The connection portion between the plate portion 2 and the inner case 3 opposite the hinge portion 4 does not form the hinge portion 4, and is defined by the second thin portion 3c and the second reinforcement rib 2d. Preferably, the other connection portion between the plate portion 2 and the inner case 3 with no hinge portion 4 is provided with the second thin portion 3c and the second reinforcement rib 2d.

In the sixth embodiment shown in FIG. 6(A), the first thin portion 4a which forms the hinge portion 4 is formed along the outer surface of the leg portion 3a of the inner case 3, and the triangular first rib 4b is attached to the back surface thereof. In the seventh embodiment shown in FIG. 6(B), the first thin portion 4a which forms the hinge portion 4 is formed outside the leg portion 3a of the inner case 3 diagonally, and the first rib 4b with substantially trapezoidal shape is attached to the outer surface of the inner case. In the eighth embodiment shown in FIG. 6(C), the first thin portion 4a which forms the hinge portion 4 is formed at the outward extending portion 3b of the inner case 3, and the substantially quadrilateral first rib 4b is attached to the outer surface of the inner case. In any of the aforementioned cases, the same effects as those derived from the first embodiment may be obtained. In the sixth to the eighth embodiments, the plate portion 2 is formed substantially vertically to the inner case 3. However, the plate portion 2 may be formed diagonally to the inner case 3 likewise the first embodiment.

Figure 7A:
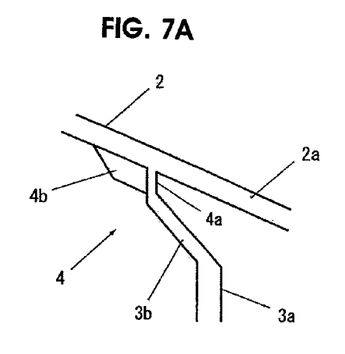
Figure 7B:
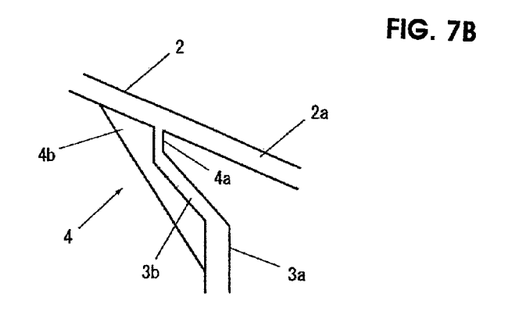
FIG. 7B shows a second modified example.
Figure 7C:
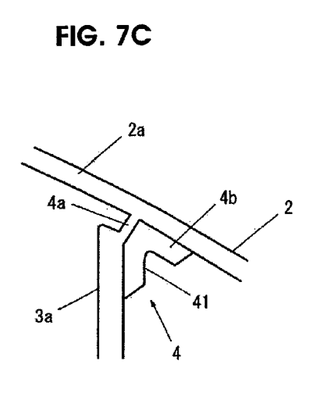
FIG. 7C shows a third modified example.
Figure 7D:
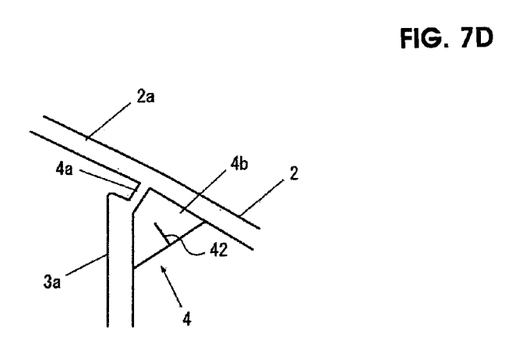
FIG. 7D shows a fourth modified example.

A modified example of the first rib 4b of the airbag cover 1 according to the present invention will be described. FIG. 7 shows modified examples of the first rib. FIG. 7(A) shows a first modified example, FIG. 7(B) shows a second modified example, FIG. 7(C) shows a third modified example, and FIG. 7(D) shows a fourth modified example. In each of the drawings, the same components as those described in the first embodiment with respect to the airbag cover shown in FIG. 1 will be designated with the same reference numerals and explanations thereof, thus will be omitted.

In the first modified example of the first rib 4b shown in FIG. 7(A), the first rib 4b is connected to the back surface of the plate portion 2 and the first thin portion 4a. In the second modified example of the first rib 4b shown in FIG. 7(B), the first rib 4b is connected to the back surface of the plate portion 2, the first thin portion 4a, the extending portion 3b and the leg portion 3a. In the first embodiment shown in FIG. 1(C), the first rib 4b is connected to the back surface of the plate portion 2, the first thin portion 4a, and the extending portion 3b. The configuration of the first rib 4b is arbitrarily changed in accordance with rigidity and turning performance required for the hinge portion 4 to set the conditions including the number of ribs, configuration, size, and thickness. Any of the first rib 4b according to the first embodiment, first modified example, and the second modified example may be combined.

In the third modified example of the first rib 4b shown in FIG. 7(C), the first rib 4b has a notch 41. In the fourth modified example of the first rib 4b shown in FIG. 7(D), the first rib 4b has a tear line 42. The notch 41 and the tear line 42 serve as the adjustment member for adjusting the degree of bending or buckling of the first rib 4b upon inflation/development of the airbag. The use of the adjustment member allows the degree of bending or buckling to be adjusted in accordance with rigidity and turning performance required for the hinge portion 4 under the condition other than the number of the first ribs 4b and the thickness. The notch 41 and the tear line 42 may be formed in the first rib 4b connected to the side with the extending portion 3b.

Figure 8A:
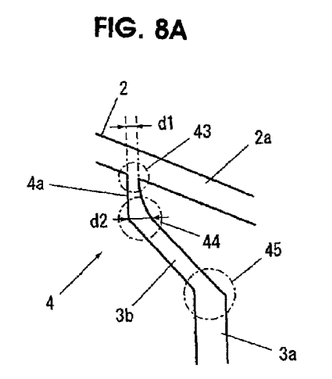
FIG. 8A shows a first modified example.
Figure 8B:
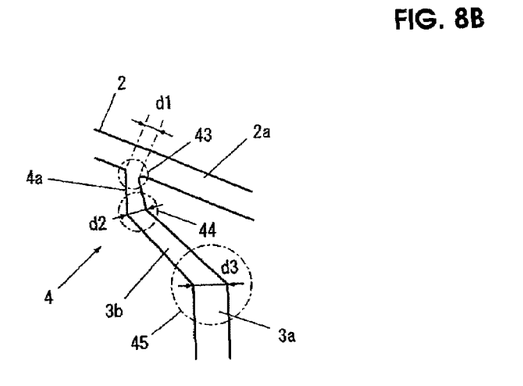
FIG. 8B shows a second modified example.
Figure 8C:
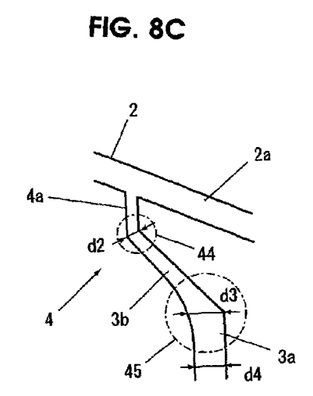
FIG. 8C shows a third modified example.
Figure 8D:
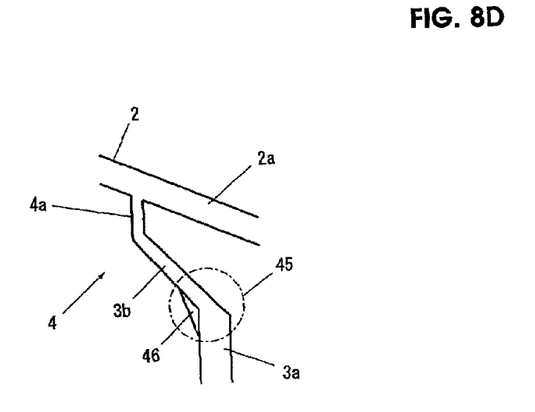
FIG. 8D shows a fourth modified example.
Figure 9A:
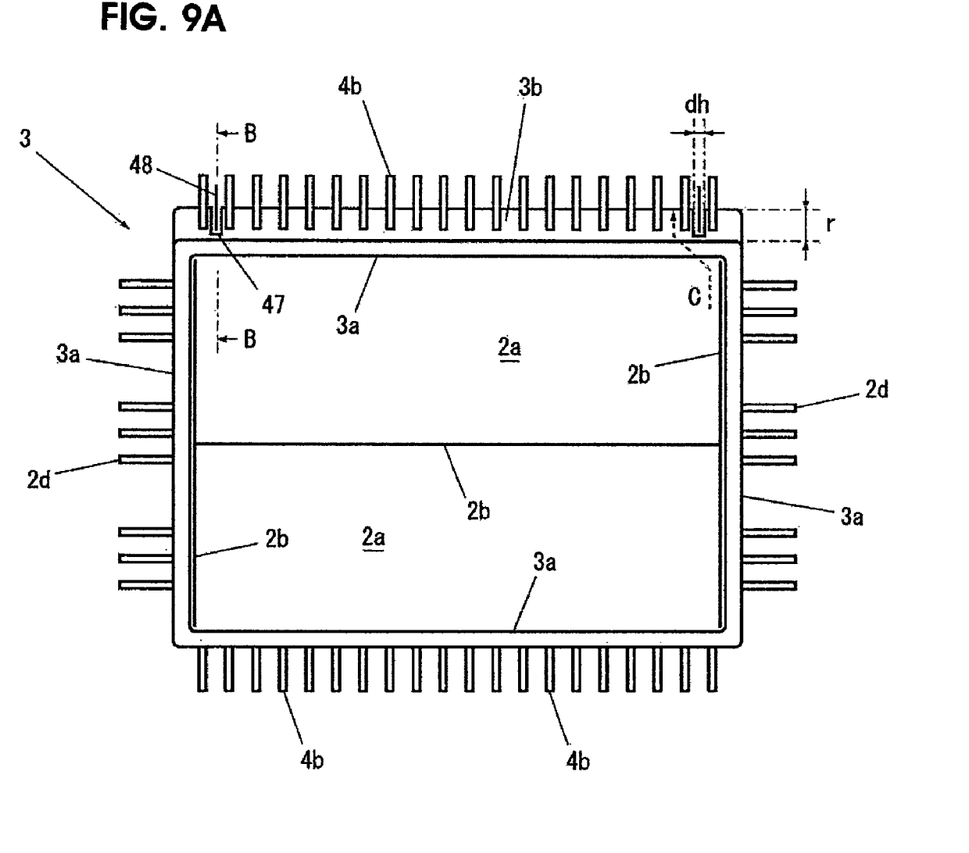
FIG. 9A is a back view.
Figure 9B:
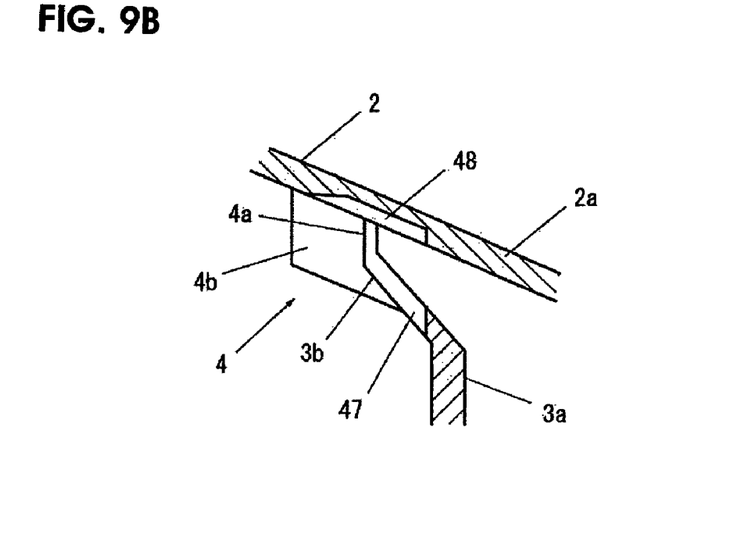
FIG. 9B is a sectional view taken along line B-B shown in FIG. 9A.

Modified examples of the hinge portion 4 of the airbag cover 1 according to the present invention will be described. FIG. 8 shows modified examples of the hinge portion. FIG. 8(A) shows a first modified example, FIG. 8(B) shows a second modified example, FIG. 8(C) shows a third modified example, and FIG. 8(D) shows a fourth modified example. FIG. 9 shows a fifth modified example of the hinge portion. FIG. 9(A) is a back view, and FIG. 9(B) is a sectional view taken along line B-B shown in FIG. 9(A). FIG. 9(A) omits the view of the plate portion 2 connected to the inner case 3. In the respective drawings, the same components as those described in the first embodiment with respect to the airbag cover shown in FIG. 1 and the like will be designated with the same reference numerals, and explanations thereof, thus will be omitted.

In the respective modified examples shown in FIGS. 8(A) to 8(D), the portion where the plate portion 2 is connected to the first thin portion 4a will be referred to as a connecting portion 43, a portion where the first thin portion 4a is connected to the extending portion 3b will be referred to as a first joint portion 44, and a portion where the extending portion 3b is connected to the leg portion 3a will be referred to as a second joint portion 45. The connecting portion 43 has a thickness d1, the first joint portion 44 has a thickness d2, the second joint portion 45 has a thickness d3, and the leg portion 3a has a thickness d4, respectively.

In the first modified example of the hinge portion 4 shown in FIG. 8(A), the first joint portion 44 has a curved inner surface such that the first thin portion 4a is formed to gradually increase its thickness toward the first joint portion 44 from the connecting portion 43, and the thickness d2 of the first joint portion 44 becomes larger than the thickness d1 of the connecting portion 43. The thickness d1 of the connecting portion 43 may be set to satisfy the condition of the first thin portion 4a in consideration with the resin flow upon resin molding of the inner case 3 and suppression of the sink upon resin curing. Therefore, the first thin portion 4a is set to satisfy the condition of $0.5 \text{ mm} \leq d1 \leq 1.0 \text{ mm}$, for example. It may be set to satisfy the condition of $0.5 \text{ mm} \leq d1 \leq d2 \leq 1.0 \text{ mm}$ in accordance with the rigidity and turning performance required for the hinge portion 4.

In the second modified example of the hinge portion 4 shown in FIG. 8(B), the respective thicknesses of the connecting portion 43, the first joint portion 44 and the second joint portion 45 are gradually increased in sequence, that is, the hinge portion 4 of the second modified example satisfies the condition of $d1<d2<d3$. In the second modified example, the first thin portion 4a is formed to satisfy the condition of $0.5 \text{ mm} \leq d1 \leq 1.0 \text{ mm}$, for example. It may be set to satisfy the condition of $0.5 \text{ mm} \leq d1 < d2 \leq 1.0 \text{ mm}$ in accordance with the rigidity and turning performance required for the hinge portion 4. The thickness of the second joint portion 45 is made larger than that of the first joint portion 44 so as to efficiently flow the resin upon the resin molding of the inner case 3.

In the third modified example of the hinge portion 4 shown in FIG. 8(C), the outer surface of the second joint portion 45 is curved. As a result, the thickness of the extending portion 3b is set to be gradually increased to the second joint portion 45 from the first joint portion 44. That is, the extending portion 3b is formed to satisfy the condition of $d2<d3$. It is preferable to form the second joint portion 45 thicker than the leg portion 3a. Specifically the second joint portion 45 is formed to have the maximum thickness conforming to the condition of $d3>d4$. The second joint portion 45 is made thicker than the leg portion 3a to improve rigidity of the hinge portion 4, thus suppressing deformation of the inner case 3 upon inflation/development of the airbag, and distortion of the rotating axis of the hinge portion 4.

In the fourth modified example of the hinge portion 4 shown in FIG. 8(D), a third rib 46 is attached to the outer surface of the second joint portion 45. The use of the third rib 46 instead of increasing the thickness d3 of the second joint portion 45 may adjust rigidity of the second joint portion 45, thus suppressing deformation of the inner case 3 upon inflation/development of the airbag, and distortion of the rotating axis of the hinge portion 4.

In the fifth modified example of the hinge portion 4 shown in FIG. 9, the low-rigidity portions each with rigidity lower than the other extending portion 3 is formed around both ends along the rotating axis of the hinge portion 4. Referring to FIGS. 9(A) and 9(B), the low-rigidity portion may be formed as a slit 47 by partially cutting the extending portion 3b and the first thin portion 4a. The low-rigidity portion may be formed as the tear line or the linear notch instead of the slit 47. The low-rigidity portion is formed at the inner side of the corner of the inner case 3, that is, the position at which the rigidity of the side surface (leg portion 3a along the tear line 2b) provided with the second reinforcement rib 2d is not lowered so as to fix the positions at both ends of the rotating axis of the hinge portion 4. The above-formed low-rigidity portion suppresses distortion of the rotating axis of the hinge portion 4 to smoothly turn the door member 2a. A width dh of the slit 47 is set to the value equal to or smaller than the pitch distance of the first rib 4b. Specifically, the width dh of the slit 47 is set to be equal to or smaller than 15 mm (more preferably, in the range from 3 to 15 mm). The low-rigidity portion is not required to be positioned as shown in the drawing. It may be formed between the first ribs 4b at the inner side. Alternatively, plural slits 47 may be formed.

Referring to FIGS. 9(A) and 9(B), in the fifth modified example, a tear line 48 is formed in the plate portion 2 and the door member 2a inside the slit 47. As the tear line 48 is formed around the low-rigidity portion, the split direction of the plate portion 2 and the door member 2a may be guided to a dashed arrow direction C. This makes it possible to smoothly turn the door member 2a while stabilizing the split direction. The tear line 48 may be connected to the tear line 2b to form the crank. However, those tear lines 48 and 2b are apart from each other to effectively absorb the impact generated upon turning of the door member 2a. Referring to FIG. 9(B), the tear line 48 may be formed to have the depth gradually reduced in the outward direction of the plate portion 2. As a gradually changing portion is formed on the outer side of the tear line 48, split of the plate portion 2 may be effectively stopped while suppressing the impact generated upon split of the plate portion 2.

Figure 10:
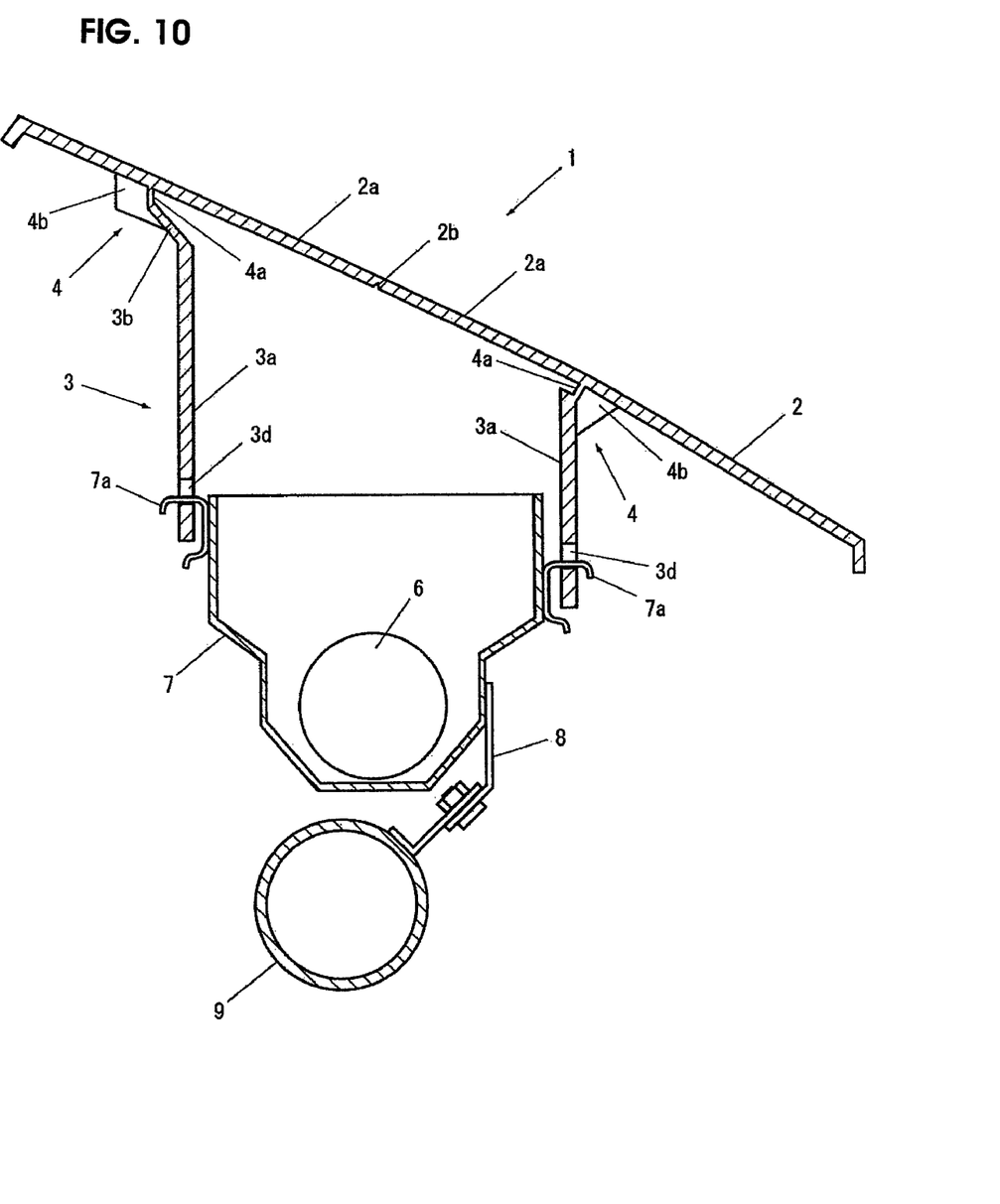
FIG. 10 is a sectional view showing an airbag device according to the present invention.

An airbag device according to the present invention will be described. FIG. 10 is a sectional view of the airbag device according to the present invention. The same components as described in the first embodiment with respect to the airbag cover shown in FIGS. 1 and 2 will be designated with the same reference numerals, and explanations thereof, thus will be omitted.

The airbag device shown in FIG. 10 includes the airbag (not shown) which is normally folded and inflated/developed in an emergency, the inflator 6 which supplies gas to the airbag, the retainer 7 which stores at least the airbag, and the airbag cover 1 which engages the retainer 7 and forms the vehicle interior surface. The inflator 6 may be disposed outside the retainer 7 rather than being stored therein. The retainer 7 is engaged with an engagement hole 3d formed in the leg portion 3a of the inner case 3 with a hook 7a connected to the side surface, and connected to a fixing member 9 via the connecting member 8.

The airbag device is formed as the passenger airbag, and installed in the instrument panel to the front of the passenger seat. The surface of the airbag cover 1 forms a part of the instrument panel. The airbag cover 1 according to the first embodiment shown in FIGS. 1 and 2 is employed. The first thin portion 4a formed at the connection portion between the plate portion 2 and the inner case 3 is capable of suppressing deformation at the connection portion caused by shrinkage upon the resin curing, and preventing generation of the sink on the surface of the airbag cover 1. This makes it possible to improve the outer appearance of the airbag cover 1. The hinge portion 4 is formed by attaching the first rib 4b to the outer surface of the first thin portion 4a such that the thin portion for forming the hinge portion 4 does not have to be formed on the plate portion 2, thus simplifying the structure of the hinge portion 4. The first rib 4b is formed to be bent or buckled to absorb the impact generated upon turning of the door member 2a, thus suppressing disengagement of the door member 2a while maintaining the development performance of the airbag.

In the aforementioned embodiments, the passenger airbag device has been described as the airbag device. Besides the passenger airbag device, any type of the airbag device, for example, the airbag device for driver's seat, the side airbag device, the knee airbag device and the like may be employed so long as it is capable of employing the airbag cover 1 according to the present invention.

The present invention is not limited to the embodiments as described above. The airbag cover 1 according to the second to the eighth embodiments may be employed. The second rib 4c described in the second embodiment may be attached to the hinge portion 4 as described in the third to the eighth embodiment of the airbag cover 1. The present invention may be changed to various forms without deviating from the scope of the invention.

What is claimed is:
1. An airbag device comprising:
an airbag;
an airbag cover;
spaced leg portions of the cover along which the airbag is deployed;
a plate portion of the cover having a generally flat configuration with generally flat top and back surfaces thereof as the plate portion extends between and across the leg portions and having a tear line so that airbag deployment causes the plate portion to rupture along the tear line;
a hinge that integrally connects the plate portion and at least one of the leg portions with air bag deployment causing the plate portion to turn open about the hinge;
a thin portion of the hinge having a predetermined length and width with the width being sized so that the thin portion is thinner than adjacent portions of the plate portion and the one leg portion; and
a reinforcement member having an upper end surface connected to the generally flat plate portion back surface for the full extent of the upper end surface and extending down therefrom in engagement with and down along an outer surface of the hinge thin portion with the reinforcement member having a constant thickness greater than the width of the hinge thin portion and extending down from the plate portion along the hinge thin portion outer surface for a predetermined distance greater than the predetermined length of the hinge thin portion to extend downward along the entire length of the hinge thin portion and down beyond the hinge thin portion with the predetermined distance being approximately equal to or greater than a length of the full extent of the upper end surface extending along the plate portion back surface so that the reinforcement member is compressed as the airbag is deployed with the reinforcement member bending and buckling to absorb impact forces generated by the rapid turning of the plate portion during airbag deployment for keeping the plate portion connected to the one leg portion despite the hinge thin portion.

2. The airbag device of claim 1 wherein the reinforcement member comprises a thin rib attached to the hinge thin portion.

3. The airbag device of claim 1 wherein the thin portion extends transverse to the one leg portion.

4. The airbag device of claim 1 wherein the one leg portion has an outwardly extending portion connected and extending transversely to the thin portion.

5. The airbag device of claim 1 wherein the plate portion has outer portions thereof that extend beyond the leg portions and which include reinforcement ribs connected thereto that are thicker than the reinforcement member.

6. The airbag device of claim 1 wherein the reinforcement member includes a strength adjustment portion so that strength of the reinforcement member can be selectively adjusted.

7. The airbag device of claim 6 wherein the strength adjustment portion comprises a notch or tear line in the reinforcement member.

8. The airbag device of claim 1 including another hinge that integrally connects the other leg portion to the plate portion with the tear line extending between the hinges so that plate portion is divided into door members that turn open about the respective hinges upon airbag deployment, wherein the other hinge includes a thin portion that is thinner than adjacent portions of the plate portion and the other leg portion, and a reinforcement member adjacent the other hinge thin portion arranged and configured to absorb impact forces generated by the rapid turning of the associated door member for keeping the plate portion connected to the one leg portion despite the hinge thin portion.

9. The airbag device of claim 8 wherein the hinge thin portions have different configurations with one of the hinge thin portions extending outwardly from an inner case for the airbag to allow one of the door members associated with the one hinge thin portion to turn open faster than the other door member.

10. The airbag device of claim 1 wherein the leg portions are elongated to extend generally parallel to the tear line, and the reinforcement member comprises a plurality of reinforcement members that are equally spaced from each other by a predetermined distance along the one leg portion.

11. An airbag cover formed by using a resin material for integrally molding a plate portion which forms a vehicle interior surface with an inner case to be disposed on a back surface of the plate portion to form an inflation/development path of an airbag, comprising a door member formed in the plate portion to have a constant thickness and so as to be split through a tear line formed in the plate portion upon inflation/development of the airbag, and a hinge portion which turnably retains the door member, wherein the hinge portion includes a first thin portion formed at a connection portion between the inner case and the plate portion having a thickness equal to or less than that of the plate portion at the tear line, and a plurality of first ribs having a predetermined, constant thickness disposed on an outer surface of the first thin portion and extending for a predetermined distance along the plate portion back surface with the first ribs being compressed so as to be buckled upon the inflation/development of the airbag, and further including a plurality of reinforcement ribs on the plate portion back surface that extend outwardly therealong from connections with the outer surface of the first thin portion for a length substantially greater than the predetermined distance that the first ribs extend along the plate portion back surface with the first ribs being buckled by the plate portion adjacent the hinge portion upon inflation and development of the airbag.

12. The airbag cover according to claim 11, wherein the thickness of the first ribs is larger than that of the first thin portion.

13. The airbag cover according to claim 11, wherein the first ribs are sequentially arranged at a pitch ranging from 3 to 15 mm.

14. The airbag cover according to claim 11, wherein the first ribs include an adjustment portion capable of adjusting a degree of bending or buckling generated upon the inflation/development of the airbag.

15. The airbag cover according to claim 11, wherein:
the reinforcement ribs have a thickness substantially equal to or larger than that of the first rib.

16. The airbag cover according to claim 11, wherein the thickness of the first thin portion is set to be in the range from 0.5 to 1.0 mm, the thickness of the first rib is set to be in the range from 1.0 to 1.3 mm, and the thickness of the reinforcement rib is set to be in the range from 1.0 to 1.8 mm.

17. The airbag cover according to claim 11, wherein the first thin portion is diagonally formed outside the inner case.

18. The airbag cover according to claim 11, wherein the first thin portion is formed at an extending portion extended outwardly from the inner case.

19. The airbag cover according to claim 18, wherein a first joint portion defined by the first thin portion and the extending portion has a thickness larger than that of a connecting portion which connects the first thin portion to the plate portion.

20. The airbag cover according to claim 19, wherein a second joint portion defined by the extending portion and a leg portion of the inner case has a thickness larger than that of the first joint portion.

21. The airbag cover according to claim 20, wherein the second joint portion has rigidity higher than that of the leg portion.

22. The airbag cover according to claim 18, wherein the extending portion includes low-rigidity portions each with rigidity lower than that of another portion, which are formed around both ends along the hinge portion.

23. The airbag cover according to claim 22, wherein the plate portion includes a tear line formed around the low-rigidity portion.

24. The airbag cover according to claim 18, wherein the second rib has a volume or a thickness smaller than the first rib, or the number of the second ribs is smaller than that of the first ribs.

25. The airbag cover according to claim 11, wherein a second rib with strength lower than that of the first rib is attached to an inner surface of the first thin portion.

26. The airbag cover according to claim 11, wherein a second thin portion is formed at a portion for connecting the plate portion to the inner case, which does not form the hinge portion.

27. The airbag cover according to claim 26, wherein:
the second thin portion has a thickness substantially equal to or smaller than that of the plate portion at the tear line.

28. The airbag cover of claim 11 in combination with:
an airbag which is folded in a normal state, and inflates and develops in an emergency;
an inflator which supplies gas to the airbag;
a retainer which stores at least the airbag; and
the airbag cover being engaged with the retainer to form a vehicle interior surface.

* * * * *